United States Patent [19]

Shimizu et al.

[11] Patent Number: 5,574,477
[45] Date of Patent: Nov. 12, 1996

[54] DIRECT-VISION/PROJECTION TYPE LIQUID-CRYSTAL DISPLAY

[75] Inventors: Makoto Shimizu, Ohgaki; Masahiro Okuyama, Inazawa; Kazuhiko Moriwaki; Atsuyoshi Tanioka, both of Gifu; Hisao Uehara, Ohgaki; Norio Miura, Ohta, all of Japan

[73] Assignee: Sanyo Electric Co., Inc., Osaka, Japan

[21] Appl. No.: 553,828

[22] Filed: Nov. 6, 1995

Related U.S. Application Data

[63] Continuation of Ser. No. 313,340, Sep. 27, 1994, abandoned.

[30] Foreign Application Priority Data

Sep. 30, 1993 [JP] Japan ..................... 5-245575

[51] Int. Cl.$^6$ ..................................... G09G 3/36
[52] U.S. Cl. .......................... 345/102; 348/748
[58] Field of Search ............... 345/4, 5, 87, 101, 345/102; 348/748, 794, 795; 359/48; 353/30, 31

[56] References Cited

U.S. PATENT DOCUMENTS

| | | | |
|---|---|---|---|
| 4,952,925 | 8/1990 | Haastert | 345/87 |
| 4,980,848 | 12/1990 | Griffin et al. | 361/687 |
| 5,196,993 | 3/1993 | Herron et al. | 361/681 |
| 5,233,502 | 8/1993 | Beatty et al. | 361/681 |

FOREIGN PATENT DOCUMENTS

| | | | |
|---|---|---|---|
| 59-208529 | 11/1984 | Japan | 345/102 |
| 2-210514 | 8/1990 | Japan. | |
| 3-001184 | 1/1991 | Japan. | |
| 3-154092 | 7/1991 | Japan | 345/101 |
| 4-006520 | 1/1992 | Japan. | |

*Primary Examiner*—Jeffery Brier
*Attorney, Agent, or Firm*—Loeb & Loeb LLP

[57] ABSTRACT

A single liquid-crystal display can be used to be either of direct-vision or projection type, if required. Separate display devices for monitor and OHP are not required. Further, power consumption can be reduced, with the service life of the display being prolonged to improve economy.

The liquid-crystal display includes a display housing which receives a liquid-crystal panel, a driver circuit unit and a cooling fan, the display housing being detachably mountable in a back light stand. When the display housing is mounted or dismounted in the back light stand, the fan and back light can automatically be turned on or off to reduce the power consumption. The liquid-crystal panel can be prevented from being degraded by cooling it by way of the fan.

6 Claims, 4 Drawing Sheets

DIRECT-VISION/PROJECTION TYPE LIQUID-CRYSTAL DISPLAY

This is a continuation of application Ser. No. 08/313,340, filed Sep. 27, 1994, now abandoned.

BACKGROUND OF THE INVENTION

1. Field of the Invention

The present invention relates to a direct-vision/projection type liquid-crystal display.

2. Description of the Prior Art

Liquid-crystal display devices are advantageous in that they can be reduced in size, thickness, power consumption and other aspects, and are being increasingly used in OA instruments, AV instruments and other fields.

A liquid-crystal panel comprises two substrates formed with prerequisite electrodes, a liquid-crystal layer between the electrode forming faces of the two substrates disposed opposite to each other and a polarizing plate disposed on the outside of each of the substrates. Such a liquid-crystal panel forms a liquid-crystal module with various peripheral circuits thereon, such as a scan driver circuit for supply scan signals to the scan lines of the liquid-crystal panel, a data driver circuit for supplying pixel signals to the data lines of the liquid-crystal panel to cause a desired display at each pixel, an interface circuit for preparing original pixel signals, a control circuit for controlling the timing of panel input and other circuits.

The liquid-crystal display is classified into the direct-vision type and the projection type, depending on the combination of the liquid-crystal module with a source of light. The direct-vision type liquid-crystal display is used as a monitor display for TV or personal computer terminals by combining the liquid-crystal module with a surface light emission type back light or a surface light source member such as reflecting plate or the like. The projection type liquid-crystal display is used as a projector TV for enlarging and projecting a scene displayed on the liquid-crystal panel onto a screen or the like, by incorporating the liquid-crystal module into an optical system which may comprise a high-bright light source, mirrors and lenses.

Recently, there has been developed a projection type liquid-crystal display device which can be used in an overhead projector (OHP). Such a projection type liquid-crystal display uses a liquid-crystal module connected to a computer in place of OHP films which are generally used in overhead projectors. In such an OHP liquid-crystal display, the displayed scene can be handled through the computer's input unit such as a keyboard or the like, and does not require the time-consuming job of manually handling the OHP films. Particularly, if the liquid-crystal module is of an active matrix type, dynamic picture images can be displayed through input of R, G and B signals.

As described, the liquid-crystal display is classified into the direct-vision type and the projection type. The direct-vision type liquid-crystal display for TV or personal computer terminals requires a light source member such as back light or reflecting plate while the projection type liquid-crystal display does not require such a light source member since it uses a light source in the OHP. Unfortunately, the OHP liquid-crystal display raises a problem in that the liquid-crystal panel is heated by the OHP light source to reduce its display contrast. Therefore, the OHP liquid-crystal display must have means for overcoming the problem on heating.

Although the same liquid-crystal module having the same screen size can be used irrespectively of whether the liquid-crystal display is of direct-vision or projection type, the OHP liquid-crystal display may have to comprise the liquid-crystal module combined with the respective light source, depending on the application of the liquid-crystal display. Thus, the liquid-crystal display devices are disadvantageous in terms of flexibility and economy. In general, the monitor display is more frequently used to prepare data for a long time. On the other hand, the OHP liquid-crystal display is less frequently used to perform the presentation over a short time. Therefore, the OHP liquid-crystal display is lower in utilization and diffusion in spite of its high availability.

SUMMARY OF THE INVENTION

It is therefore an object of the present invention to provide a liquid-crystal display which can be used to be either of direct-vision type or projection type.

To this end, the present invention provides a liquid-crystal display comprising a liquid-crystal panel, a driver circuit unit for supplying necessary signals to the conductors of said liquid-crystal panel, a cooling device for cooling said liquid-crystal panel, a display housing receiving said liquid-crystal panel, driver circuit unit and cooling device, and a housing support for detachably supporting said display housing, said housing support including an illumination unit for irradiating light to said liquid-crystal panel, said display housing including a first switch for de-energizing said cooling device when said display housing is mounted in said housing support and for energizing said cooling device when said display housing is removed from said housing support, and said housing support including a second switch for energizing said illumination unit when said display housing is mounted in said housing support and for de-energizing said illuminating unit when said display housing is removed from said housing support.

When the display housing receiving the liquid-crystal panel, driver circuit and cooling device is detachably mounted in the display housing support including the illumination unit (back light) in the aforementioned manner, the display housing can be used as a direct-vision type monitor display used to prepare data when the display housing is mounted in the display housing support. On the other hand, when the display housing is removed from the support, the liquid-crystal display may be placed on an OHP base to be used as an OHP type display in projection view mode, for example.

As the display housing is mounted in the display housing support, the second switch is automatically actuated to turn the back light on while the first switch is also automatically actuated to de-energize the cooling device. If it is desired to use the liquid-crystal display as a projector type display, the cooling device is automatically energized to prevent the liquid-crystal panel from being heated by the strong light from the light source which would cause a reduction in the quality of display.

The liquid-crystal display of the present invention can automatically be switched to energize either the back light or cooling device, depending on whether the liquid-crystal display is to be used as the direct-vision or projection type. Thus, the manually switching job can be omitted. Further, the liquid-crystal display may be improved in terms of power consumption and exhaustion.

The housing support may have a pusher for actuating the first switch when the display housing is mounted in the housing support while the display housing may include another pusher for actuating the second switch when the display housing is mounted in the housing support. This can provide a very simplified construction which can automatically select and energize either of the back light or cooling device. Such a construction is advantageous in terms of manufacturing cost and system size.

The cooling device may include a fan. The display housing may include an air passage formed therein which supplies air from the fan to the surface of the liquid-crystal panel on the side of the light source. When the fan is rotated, the air therefrom can cool the light source side surface of the liquid-crystal panel which tends to be heated by the light from the light source. For example, even if the liquid-crystal display is used as a projector type display on the OHP base for a long time, the quality of display in the liquid-crystal display will not be adversely affected by the heat.

DETAILED DESCRIPTION OF THE PREFERRED EMBODIMENTS

Figure 1:
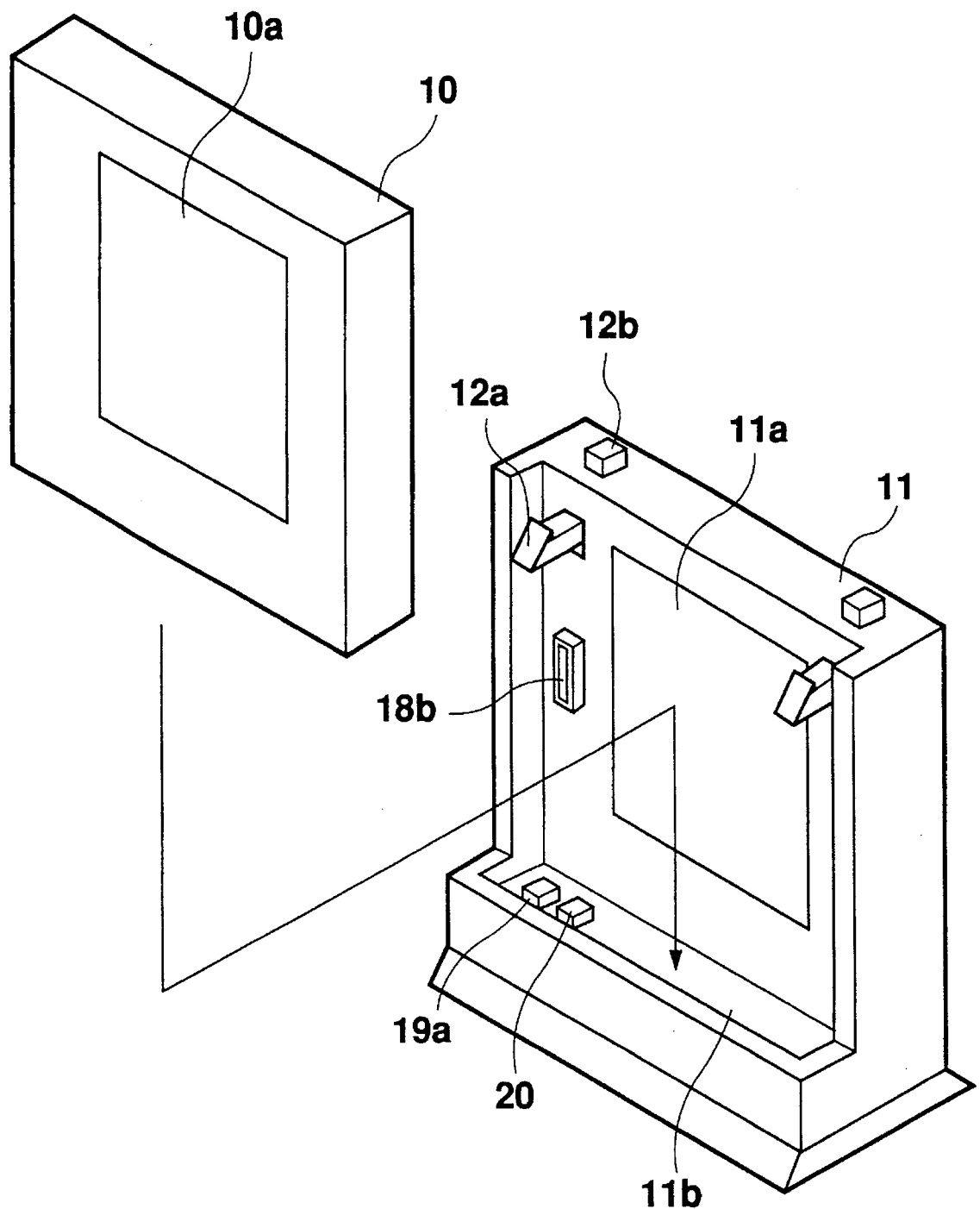
FIG. 1 is a perspective view of one embodiment of a liquid-crystal display constructed in accordance with the present invention.

Referring to FIG. 1, there is shown a display housing (10) including a liquid-crystal module which comprises a liquid-crystal panel and a driver circuit unit and a cooling fan. The display housing (10) is detachably mounted in a back light stand (11) on which a back light is mounted. The portion of the display housing (10) opposite to a light emitting portion (11a) in the back light stand (11) is formed with an opening (10a) through which the light from the back light passes. When the display housing (10) is to be mounted in the back light stand (11), the bottom of the display housing (10) is brought into engagement with the bottom groove (11b) of the back light stand (11) while the upper lock portion of the back light stand (11) is locked to fix the display housing (10) to the back light stand (11). In such a manner, the display housing (10) can firmly be mounted in the back light stand (11).

Figure 2:
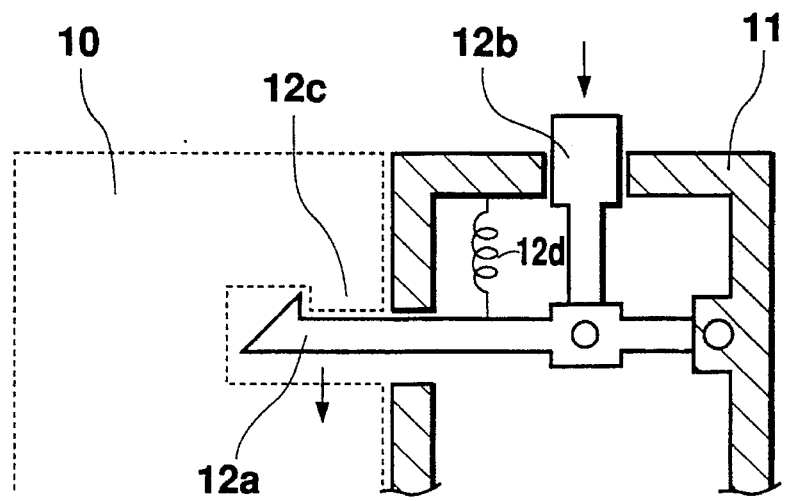
FIG. 2 is a cross-sectional view of the lock portion shown in FIG. 1.

As shown in FIG. 2, the lock portion of the back light stand (11) comprises a lock hook (12a) extending outward from the back light stand (11) and biased upward under the action of a spring (12d), a lock button (12b) for depressing the lock hook (12a) and a stop (12c) formed in the display housing (10). When the display housing (10) is to be removed from the back light stand (11), the lock button (12b) is depressed to dis-engage the lock hook (12a) from the stop (12c) so that the display housing (10) can be removed from the back light stand (11) in the forward and upward direction.

Figure 3:
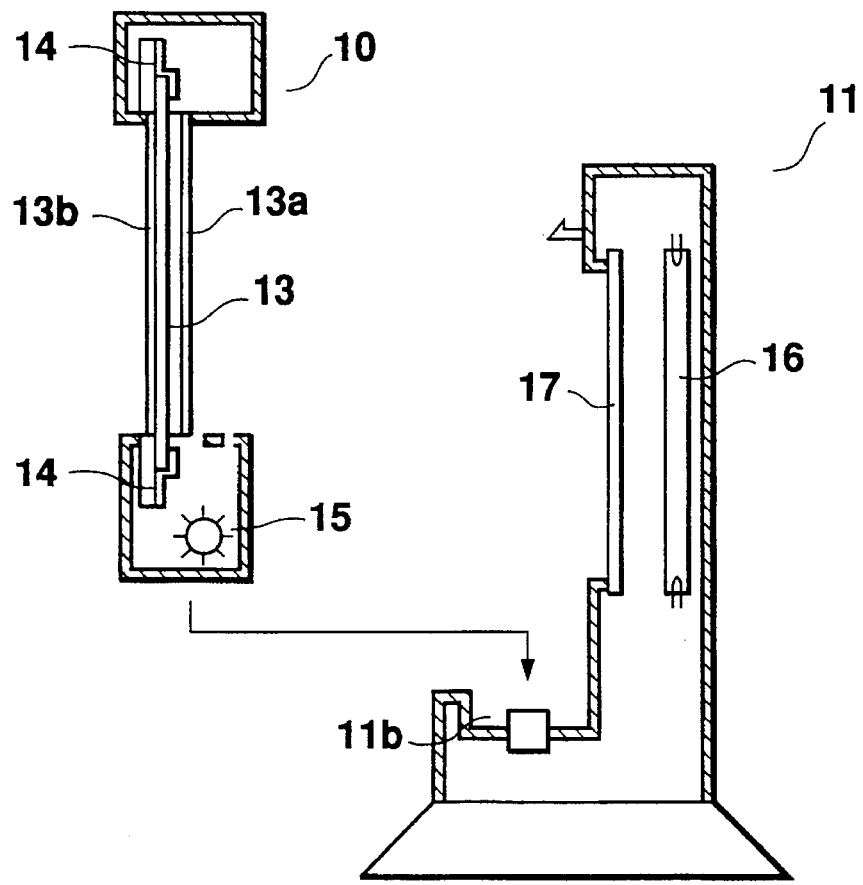
FIG. 3 is a cross-sectional view of the liquid-crystal display shown in FIG. 1 as viewed from the lateral direction.
Figure 4:
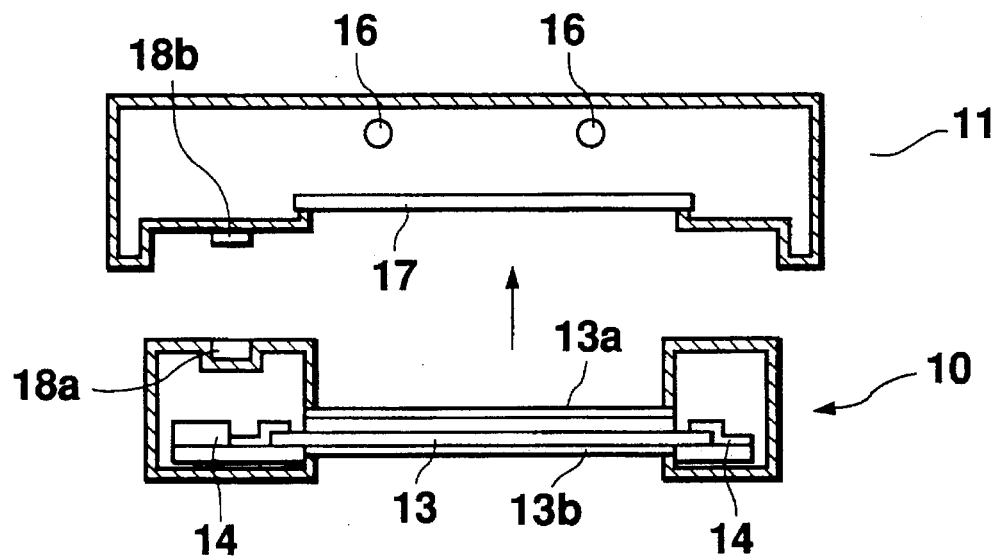
FIG. 4 is a cross-sectional view of the liquid-crystal display shown in FIG. 1 as viewed from the upward direction.

FIG. 3 is a cross-sectional view of the display housing (10) of FIG. 1 as viewed from the lateral direction while FIG. 4 is a cross-sectional view of the same display housing (10) as viewed from the upward direction. The display housing (10) comprises a liquid-crystal panel (13) which comprises two substrates each including the necessary conductor pattern formed thereon, a liquid-crystal layer located between the inner sides of the substrates disposed opposite to each other and a polarizing plate (13a or 13b) disposed on the outer sides of each of the substrates. The display housing (10) also comprises a driver circuit portion (14) which may be in the form of a printed circuit board formed in the marginal part of the liquid-crystal panel (13) and a fan (15) for cooling the liquid-crystal panel (13). When the display housing (10) is used for projector type viewing, it is detached from the back light stand and is placed on the OHP base (not shown). The fan (15) of the display housing (10) is adapted to extend from the bottom of the display housing (10). As the fan (15) is rotated, air is fed into a space between the liquid-crystal panel (13) and the OHP base through a passage formed in the display housing (10). Thus, the air cools the surface of the liquid-crystal panel (13). For the use of the display as a monitor in a direct-vision mode, the back light stand (11) includes a back light portion which comprises a light source or back light (16), such as fluorescent lamp or electronic luminescence, and a diffuser panel (17) for equalizing the illuminating light from the back light (16) before it enters the liquid-crystal panel (13).

Figure 6:
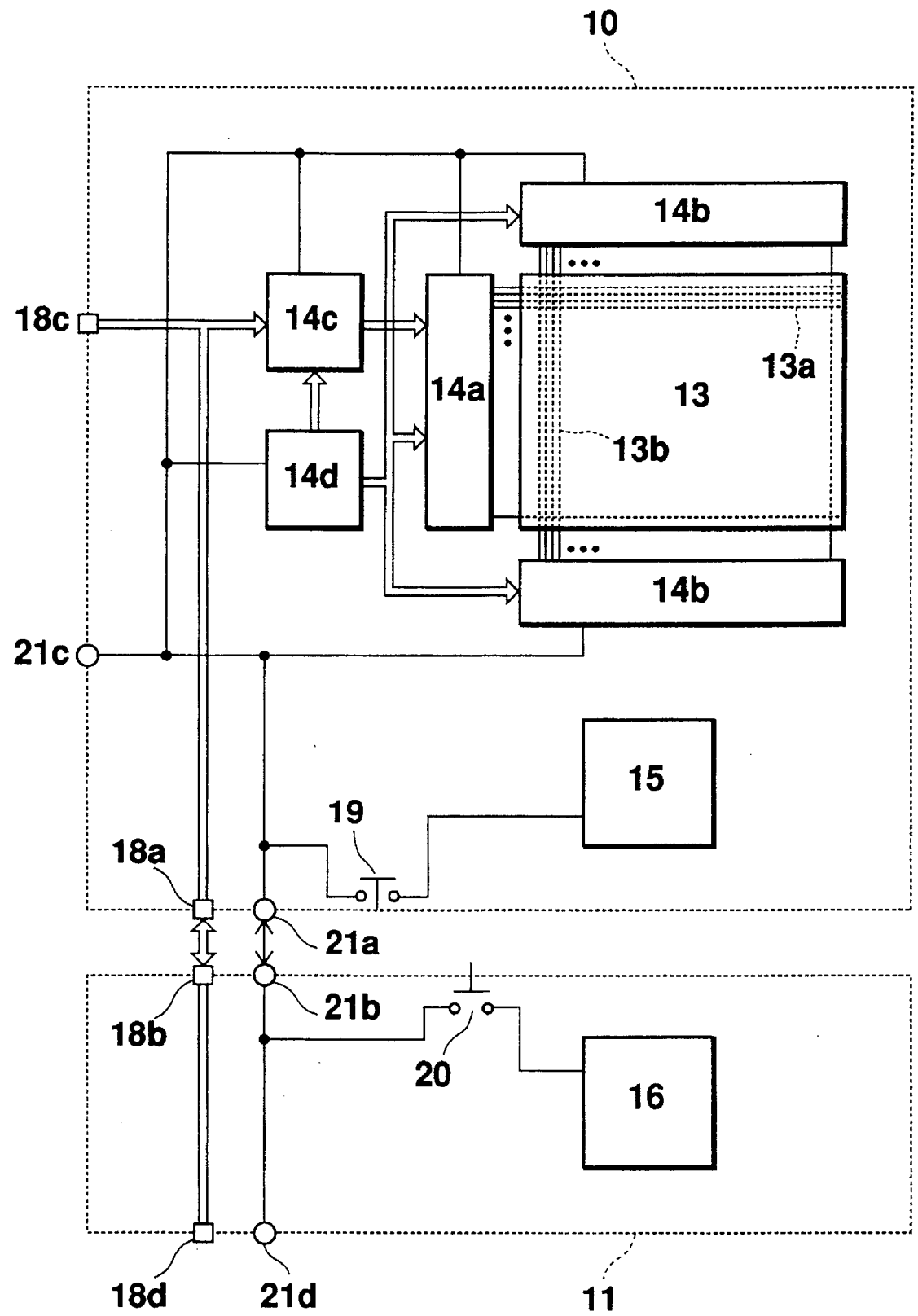
FIG. 6 is a wiring diagram of the liquid-crystal display shown in FIG. 1.

As shown in FIGS. 1 and 4, the display housing (10) and back light stand (11) have signal connectors (18a, 18b), respectively. When the display housing (10) is mounted in the back light stand (11) to use the liquid-crystal panel (13) as a monitor, the signal connectors (18a, 18b) are connected to each other such that signals, inputted into the back light stand (11) through an external signal connector (18d) cable-connected to an external signal source such as computer, will be supplied to the driver circuit unit (14) of the display housing (10) through the connectors (18a, 18b). When the display housing (10) is mounted in the back light stand (11), the display cannot be used in the projection viewing mode. When the liquid-crystal display is to be used in the OHP, the display housing (10) is removed from the back light stand (11). As shown in FIG. 6, another signal connector (18c) in the display housing (10) is connected to an external signal source through a cable. The display housing (10) is placed on the OHP base to provide a desired display through the opening 10a in the liquid-crystal panel (13). The liquid-crystal panel (13), installed in the display housing (10), provides a light valve for the OHP. In such a manner, the liquid-crystal display can be used for OHP. The external signal connector (18c) may be replaced by the signal connector (18a). If the signal connectors (18a, 18b) are connected through a cable, signals may be taken in through the back light stand (11) even in the OHP mode as in the monitor mode.

Figure 5:
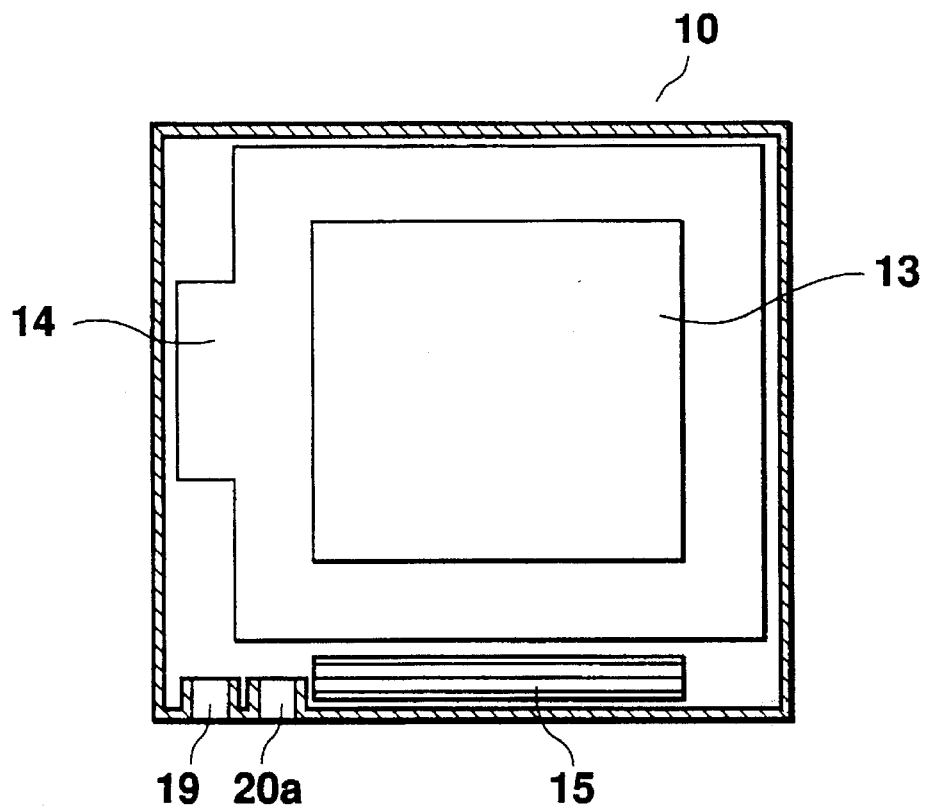
FIG. 5 is a plan view, partially broken, of the liquid-crystal display shown on FIG. 1.

FIG. 5 is a partially broken view of the interior of the display housing (10). The bottom of the display housing (10) comprises an embedded type switch (19) and pressure part (20a) formed therein. On the other hand, the bottom groove portion (11b) of the back light stand (11) comprises a projection (19a) and a projecting switch (20) which are formed in the back light stand (11) at positions respectively corresponding to the embedded type switch and pressure part (19, 20a) of the display housing (10), as shown in FIG. 1. When the display housing (10) is mounted in the back light stand (11) for use of the display as a monitor of direct-vision mode, therefore, the switches (19, 20) will be depressed by the projection (19a) and pressure part (20a), respectively. The switch (19) is connected to the wiring for the fan (15). When the switch (19) is depressed, therefore, the fan (15) is electrically disconnected from the power source and turned off. When the switch (19) is not depressed, that is, when the display housing (10) is removed from the back light stand (11) for use in the projection viewing mode, the fan (15) is in connection to the power source for rotation and will send air toward the liquid-crystal panel (13). On the other hand, the switch (20) is connected to the wiring in the back light (16). When the switch (20) is in an ON state, therefore, the back light (16) is also in an ON state. If the switch (20) is in OFF state, the back light (16) is lighted off.

FIG. 6 is a wiring diagram of the embodiment of the present invention. In addition to the liquid-crystal panel (13), the display housing (10) comprises a scan driver circuit (14a) for selecting scan lines (13a), a data driver circuit (14b) for supplying pixel signals to data lines (13b) in the liquid-crystal panel (13) to provide a desired display in the liquid-crystal panel (13) at the respective pixel, and an interface circuit (14c) for preparing original pixel signals. The display housing (10) further comprises a control circuit (14d) for controlling the timing of selection for the signal lines (13a, 13b) in the liquid-crystal panel (13), that is, the timing of panel input. These circuits are connected in parallel to an external power source (not shown). The fan (15) and the back light (16) of the back light stand (11) are also connected to the external power source through the switches (19, 20), respectively. When the liquid-crystal panel (13) is to be used as a monitor, the power is supplied from an external power source connector (21d) in the back light stand (11) to the display housing (10) through connectors (21a, 21b). At the same time, the fan (15) is de-energized while the back light (16) is lighted on. When the liquid-crystal display is to be used in the OHP, the power is supplied to the display housing (10) through an external power source connector (21c) in the display housing (10) as the display housing (10) is detached from back light stand (11). The fan (15) is energized for rotation while the back light (16) is lighted off. The external power source connector (21c) may be replaced by the power source connector (21a). In such a case, the power may be taken in to the liquid-crystal display through the back light stand (11) by cable-connecting the power source connectors (21a, 21b) to each other, irrespectively of whether it is to be used for monitor or OHP.

If the liquid-crystal display is used as a projection type display, there is a problem in that the light entering the liquid-crystal panel is more intensive than in the direct-vision type display, resulting in degradation of the liquid-crystal panel due to heat. Particularly, the polarizing plate (13a) on the side of the light source may be heated to a high temperature ranging between 60° C. and 70° C. since its light absorptivity is only about 50 percent. This harms the durability of the liquid-crystal display. The degradation of the polarizing plate leads directly to a deterioration in display quality. Since the transmittivity in the liquid-crystal panel has a temperature dependency, the display contrast thereof will be reduced as the temperature increases. According to the present invention, however, the fan (15) is mounted within the display housing (10) so that the liquid-crystal panel (13) can be cooled by energizing the fan (15) when the liquid-crystal display is used in the OHP.

The embodiment is only exemplified for illustrating the invention, but the present invention will not be limited to such an embodiment. The liquid-crystal panel may be of an STN type which is well-known in the art. The support body may be a computer having a back light. The liquid-crystal display of the present invention can normally be used as a monitor for preparing data and can be used as an OHP liquid-crystal display for presentation after it has been removed from the display housing, if required. In addition, if the liquid-crystal display includes an active matrix type color liquid-crystal panel having a switch element in the form of a thin film transistor or the like at each pixel, the liquid-crystal display can display conventional TV scenes in addition to computer scenes and further enlarge and project the TV images onto a screen.

As will be apparent from the foregoing, the present invention provides the display housing receiving the liquid-crystal panel and its driver circuit, the display housing being detachably mountable in the support which includes the back light. Therefore, the liquid-crystal display according to the present invention can normally be used as a display for a personal computer and TV receiver. For presentation, the liquid-crystal display can be used in the OHP after it has been removed from the display housing in a projection viewing mode. However the display housing is mounted in the support including the back light, the liquid-crystal display cannot be used in a projection viewing mode. In other words, the liquid-crystal display according to the present invention can be used to be either of the direct-vision or projection type, if required. Thus, the present invention does not require any exclusive display means for presentation needs, such as OHP, which are not frequently required. This improves economy.

Since the fan and back light are automatically switched on or off when the display housing is mounted or dismounted on the support, the power consumption can be saved with the service lives of various parts being prolonged.

What is claimed is:

1. A liquid crystal display apparatus comprising:

a liquid-crystal panel;

a driver circuit unit for supplying necessary signals to conductors of said liquid-crystal panel;

a cooling device for cooling said liquid-crystal panel;

a display housing receiving said liquid-crystal panel, driver circuit unit and cooling device; and a housing support for detachably supporting said display housing, said housing support including an illumination unit for irradiating light to said liquid-crystal panel;

said display housing including a first switch for de-energizing said cooling device when said display housing is mounted in said housing support and for energizing said cooling device when said display housing is removed from said housing support, and said housing support including a second switch for energizing said illumination unit when said display housing is mounted in said housing support and for de-energizing said illuminating unit when said display housing is removed from said housing support.

2. A liquid-crystal display as defined in claim 1 wherein said housing support has a pusher for depressing said first switch when said display housing is mounted in said housing support;

said display housing having a pusher for depressing said second switch when said display housing is mounted in said housing support;

said first switch being operative to de-energize said cooling device when the first switch is depressed by the pusher in said housing support; and said second switch being operative to energize said illuminating part when the second switch is depressed by the pusher in said display housing.

3. A liquid-crystal display as defined in claim 2 wherein said cooling device includes a fan.

4. A liquid-crystal display as defined in claim 3 wherein said display housing includes an opening formed therein through which air sent from said fan is supplied toward a face of said liquid-crystal panel opposite to a light source.

5. A liquid crystal display apparatus for use in a projection viewing system, the liquid crystal display apparatus being mountable in a support housing for use in a direct view mode, the liquid crystal display apparatus comprising:

a liquid-crystal panel;

a driver circuit unit for supplying necessary signals to conductors of said liquid-crystal panel;

a cooling device for cooling said liquid-crystal panel; and a display housing receiving said liquid-crystal panel, driver circuit unit and cooling device, said display housing including a switch for de-energizing said cooling device when said display housing is mounted in a said housing support and for energizing said cooling device when said display housing is removed from said housing support.

6. In a projection viewing system including an overhead projector, the overhead projector including a base, the projection viewing system further including a liquid crystal display apparatus placed over the base of the overhead projector to provide a film for the overhead projector, the liquid crystal display apparatus being mountable in a support housing for use in a direct view mode, the liquid crystal display apparatus comprising:

a liquid-crystal panel;

a driver circuit unit for supplying necessary signals to the conductors of said liquid-crystal panel;

a cooling device for cooling said liquid-crystal panel; and a display housing receiving said liquid-crystal panel, driver circuit unit and cooling device, said display housing including a switch for de-energizing said cooling device when said display housing is mounted in a said housing support and for energizing said cooling device when said display housing is removed from said housing support.

* * * * *

UNITED STATES PATENT AND TRADEMARK OFFICE
CERTIFICATE OF CORRECTION

PATENT NO.   : 5,574,477
DATED        : November 12, 1996
INVENTOR(S)  : Makoto Shimizu et al.

It is certified that error appears in the above-identified patent and that said Letters Patent is hereby corrected as shown below:

<u>Title page,</u>
Item [73], Assignee, change "Sanyo Electric Co., Inc." to read -- Sanyo Electric Co., Ltd. --.

Signed and Sealed this

Fourth Day of November, 2003

JAMES E. ROGAN
*Director of the United States Patent and Trademark Office*